United States Patent
Woerner

(10) Patent No.: US 11,235,717 B2
(45) Date of Patent: Feb. 1, 2022

(54) SECONDARY ON-BOARD NETWORK BATTERY FOR A SECONDARY ON-BOARD NETWORK THAT IS REDUNDANT TO A PRIMARY ONBOARD NETWORK OF A MOTOR VEHICLE, ON-BOARD NETWORK SYSTEM, AND MOTOR VEHICLE

(71) Applicant: Bayerische Motoren Werke Aktiengesellschaft, Munich (DE)

(72) Inventor: Markus Woerner, Eichstaett (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/959,032

(22) PCT Filed: Mar. 22, 2019

(86) PCT No.: PCT/EP2019/057286
§ 371 (c)(1),
(2) Date: Jun. 29, 2020

(87) PCT Pub. No.: WO2019/201552
PCT Pub. Date: Oct. 24, 2019

(65) Prior Publication Data
US 2020/0339050 A1    Oct. 29, 2020

(30) Foreign Application Priority Data
Apr. 18, 2018   (DE) .................... 10 2018 205 850.4

(51) Int. Cl.
*B60R 16/03*   (2006.01)
*B60L 1/00*    (2006.01)
*H02J 1/10*    (2006.01)

(52) U.S. Cl.
CPC ............... *B60R 16/03* (2013.01); *B60L 1/00* (2013.01); *H02J 1/108* (2013.01); *H02J 2310/46* (2020.01)

(58) Field of Classification Search
CPC ....... B60R 16/03; B60R 16/033; B60R 16/04; B60L 1/00; B60L 15/12; B60L 50/11;
(Continued)

(56) References Cited

U.S. PATENT DOCUMENTS 5,488,283 A    1/1996  Dougherty et al.
6,301,528 B1   10/2001 Bertram et al.
(Continued)

FOREIGN PATENT DOCUMENTS

DE     40 28 242 A1    3/1992
DE     197 55 050 A1   7/1999
(Continued)

OTHER PUBLICATIONS

International Search Report (PCT/ISA/210) issued in PCT Application No. PCT/EP2019/057286 dated Jul. 1, 2019 with English translation (five (5) pages).
German-language Written Opinion (PCT/ISA/237) issued in PCT Application No. PCT/EP2019/057286 dated Jul. 1, 2019 (five (5) pages).
(Continued)

*Primary Examiner* — John W Poos
*Assistant Examiner* — Alex W Lam
(74) *Attorney, Agent, or Firm* — Crowell & Moring LLP

(57) ABSTRACT

A secondary on-board network battery for a secondary on-board network that is redundant to a primary on-board network of a motor vehicle, includes: a battery cell composite for providing electrical energy; a first connection for electrically connecting the secondary on-board network battery to at least one secondary on-board network component;
(Continued)

a second connection for electrically connecting the secondary on-board network battery to the primary on-board network; a first switching device between the first connection and a connection point that is electrically connected to the battery cell composite; a second switching device between the second connection and the connection point, and a control unit configured to provide a conducting state for both switching devices for supplying the at least one secondary on-board network component from the primary on-board network, and for providing a locking state for the second switching device for keeping an overload on the primary on-board network side away.

15 Claims, 4 Drawing Sheets

(58) Field of Classification Search
CPC .......... B60L 50/50; B60L 50/60; B60L 53/20;
B60L 53/53; B60L 58/10; B60L 58/15;
B60L 58/18; B60L 58/19; B60L 58/21;
B60L 58/20; B60L 58/40; B60L 50/51;
B60L 8/003; B60L 58/22; B60L 2210/10;
B60L 3/0046; B60L 1/003; H02J 1/108;
H02J 2310/46; H02J 2310/48; H02J
2310/40; H02J 1/102; H02J 1/10; H02J
7/1423; H02J 7/34; H02J 7/342; H02J
7/0013; Y02T 10/70; Y02T 10/10; Y02T
90/167; G08C 19/02
See application file for complete search history.

(56) References Cited

U.S. PATENT DOCUMENTS

| | | |
|---|---|---|
| 2005/0003710 A1 | 1/2005 | Congdon et al. |
| 2005/0035656 A1 | 2/2005 | Kuramochi et al. |
| 2010/0253276 A1* | 10/2010 | Hung ................ H01M 8/04559 |
| | | 320/101 |
| 2014/0035361 A1* | 2/2014 | Schmidt .................. B60L 58/19 |
| | | 307/10.1 |
| 2016/0001675 A1* | 1/2016 | Kazuno ................. H01M 10/48 |
| | | 307/9.1 |
| 2016/0079233 A1* | 3/2016 | Deboy .................. H01L 29/872 |
| | | 327/427 |
| 2017/0210312 A1 | 7/2017 | Wandres et al. |
| 2019/0184922 A1 | 6/2019 | Tazarine et al. |

FOREIGN PATENT DOCUMENTS

| | | |
|---|---|---|
| DE | 198 57 916 A1 | 6/2000 |
| DE | 10 2004 032 197 A1 | 2/2005 |
| DE | 10 2005 004 330 A1 | 8/2006 |
| DE | 10 2012 207 624 A1 | 11/2013 |
| DE | 10 2015 117 766 A1 | 4/2017 |
| DE | 10 2015 222 545 A1 | 5/2017 |
| DE | 10 2016 101 081 A1 | 7/2017 |
| DE | 10 2016 101 855 A1 | 8/2017 |
| DE | 10 2016 115 823 A1 | 3/2018 |

OTHER PUBLICATIONS

German-language Office Action issued in German Application No. 10 2018 205 850.4 dated Jan. 16, 2019 (seven (7) pages).

* cited by examiner

FIG. 4

SECONDARY ON-BOARD NETWORK BATTERY FOR A SECONDARY ON-BOARD NETWORK THAT IS REDUNDANT TO A PRIMARY ONBOARD NETWORK OF A MOTOR VEHICLE, ON-BOARD NETWORK SYSTEM, AND MOTOR VEHICLE

BACKGROUND AND SUMMARY OF THE INVENTION

The invention relates to a secondary vehicle electrical system battery for a secondary vehicle electrical system which is redundant with respect to a primary vehicle electrical system of a motor vehicle, having a battery cell assembly for providing electrical energy. The invention also relates to a vehicle electrical system and to a motor vehicle.

Vehicle electrical systems for motor vehicles are already known from the prior art. Such vehicle electrical systems may have, for example, a primary vehicle electrical system with at least one primary vehicle electrical system component and at least one secondary vehicle electrical system with at least one secondary vehicle electrical system component. In this respect, DE 10 2015 117 766 A1 discloses, for example, a vehicle electrical system which has a primary vehicle electrical system and a plurality of decentralized secondary vehicle electrical systems, wherein the secondary vehicle electrical systems are supplied from the primary vehicle electrical system via their own DC/DC converters. The secondary vehicle electrical systems in this case do not have their own energy stores or batteries, but rather are supplied from a central battery of the primary vehicle electrical system.

The DC/DC converters can be used to convert an input voltage, which is provided by the primary vehicle electrical system and has a first value, into an output voltage for the secondary vehicle electrical system having a second value which differs from the first value. However, provision may also be made for such DC/DC converters to be used in the case of a fluctuating input voltage in order to provide a constant output voltage. For example, a 12 V/12 V DC/DC converter between a 12 V primary vehicle electrical system and a 12 V secondary vehicle electrical system can convert a 12 V input voltage of the primary vehicle electrical system, which is provided by the primary vehicle electrical system and possibly fluctuates, into a constant 12 V output voltage for the secondary vehicle electrical system.

However, the DC/DC converters must be connected to the different vehicle electrical systems via communication lines and power lines for transmitting electrical energy and therefore have a negative effect on an installation space in the motor vehicle and a weight of the motor vehicle. In addition, such DC/DC converters emit a power loss, for example in the form of heat, with the result that they must be cooled separately in a complicated manner.

The object of the present invention is to configure a vehicle electrical system for a motor vehicle such that it is particularly cost-effective, weight-saving and has a low power loss.

This object is achieved, according to the invention, by means of a secondary vehicle electrical system battery, a vehicle electrical system and a motor vehicle having the features according to the respective independent patent claims. The dependent patent claims, the description and the figures relate to advantageous embodiments of the invention.

A secondary vehicle electrical system battery according to the invention for a secondary vehicle electrical system which is redundant with respect to a primary vehicle electrical system of a motor vehicle has a battery cell assembly for providing electrical energy, a first connection for electrically connecting the secondary vehicle electrical system battery to at least one secondary vehicle electrical system component, and a second connection for electrically connecting the secondary vehicle electrical system battery to the primary vehicle electrical system. The secondary vehicle electrical system battery also comprises a first switching device between the first connection and a connection point electrically connected to the battery cell assembly, and a second switching device between the second connection and the connection point. A control device of the secondary vehicle electrical system battery is designed, in order to supply the at least one secondary vehicle electrical system component from the primary vehicle electrical system, to provide a conducting state for both switching devices in order to permit an energy flow from the second connection to the first connection via the connection point and, in order to keep an overload on the primary vehicle electrical system side away, to provide a blocking state for the second switching device in order to block an energy flow from the second connection to the connection point.

The invention also includes a vehicle electrical system for a motor vehicle, having a primary vehicle electrical system with at least one primary vehicle electrical system component and a primary vehicle electrical system battery for supplying the at least one primary vehicle electrical system component. The vehicle electrical system also has a secondary vehicle electrical system which is redundant with respect to the primary vehicle electrical system and has at least one secondary vehicle electrical system component and a secondary vehicle electrical system battery according to the invention or an embodiment thereof. The secondary vehicle electrical system battery is electrically connected to the at least one secondary vehicle electrical system component via the first connection and is electrically connected to the primary vehicle electrical system via the second connection.

The secondary vehicle electrical system is designed to be redundant with respect to the primary vehicle electrical system and is used, in particular, for a highly automated driving mode or a fully automated driving mode of the motor vehicle. The secondary vehicle electrical system is therefore, in particular, a highly automated driving vehicle electrical system which has the at least one secondary vehicle electrical system component that is redundant with respect to the at least one primary vehicle electrical system component and the secondary vehicle electrical system battery. The secondary vehicle electrical system battery is therefore in the form of a highly automated driving battery or a fully automated driving battery. Since components must be particularly reliable and failsafe in a driving mode in which the motor vehicle moves at least in a highly automated manner or at least in a semi-autonomous manner, they are provided both in the primary vehicle electrical system and in the secondary vehicle electrical system. If the at least one primary vehicle electrical system component fails, the secondary vehicle electrical system component which is redundant with respect to the primary vehicle electrical system component and performs the same function can therefore be used. The redundant components are, in particular, sensors and/or actuators. The sensors may be, for example, environment capture sensors and/or distance sensors. The actuators may be actuators for influencing longitudinal dynamics and lateral dynamics of the motor vehicle, for example a steering actuator and a braking actuator.

The at least one primary vehicle electrical system component can be supplied from the primary vehicle electrical system battery or the primary vehicle electrical system energy store. The at least one secondary vehicle electrical system component can be supplied from the secondary vehicle electrical system battery or the secondary vehicle electrical system energy store. For this purpose, the secondary vehicle electrical system battery has the first connection, to which the at least one secondary vehicle electrical system component can be connected. In order to provide the electrical energy for supplying the at least one secondary vehicle electrical system component, the secondary vehicle electrical system battery has the battery cell assembly. The battery cell assembly is in the form of a connection of battery cells, for example a series connection and/or a parallel connection. The battery cell assembly can provide, for example, a secondary vehicle electrical system voltage of 12 V for the at least one secondary vehicle electrical system component. The battery cell assembly has a first pole, for example a positive pole, and a second pole, for example a negative pole. One of the poles, for example the positive pole, is electrically connected to the connection point.

The connection point is also connected to the first connection via the first switching device. The first connection can therefore be connected to the battery cell assembly via the first switching device. The first switching device is designed, in particular, to permit at least an energy flow to the first connection in a conducting state and to block at least an energy flow to the first connection in a blocking state. The first switching device may have, for example, a semiconductor switch, for example a power MOSFET, which can be blocked at least in a unidirectional manner. In order to provide a bidirectional blocking ability, that is to say in order to block an energy flow in the direction of the first connection and in the direction of the connection point, the first switching device can have two anti-serial semiconductor switches and/or a relay, for example.

If, for example, the at least one secondary vehicle electrical system component is intended to be supplied with electrical energy from the battery cell assembly, the conducting state is provided for the first switching device. In order to provide the conducting state, the semiconductor switch can be activated or switched on or the relay can be closed, for example. In the conducting state, the secondary vehicle electrical system component connected to the first connection is electrically connected to the battery cell assembly via the first switching device. As an alternative or in addition to supplying energy from the battery cell assembly, however, provision may also be made for the at least one secondary vehicle electrical system component to be supplied with electrical energy from the primary vehicle electrical system. For this purpose, the secondary vehicle electrical system battery has the second connection, via which the secondary vehicle electrical system battery can be electrically connected to the primary vehicle electrical system. In particular, the primary vehicle electrical system and the secondary vehicle electrical system have approximately the same vehicle electrical system voltage, preferably 12 V. The secondary vehicle electrical system battery can therefore be electrically connected to the primary vehicle electrical system without the interposition of a DC/DC converter by directly connecting the primary vehicle electrical system to the second connection.

The second connection is electrically connected, via the second switching device, to the connection point which is also electrically connected to the first switching device. As a result, the first switching device is also electrically connected to the second switching device. The second switching device is designed, in particular, to permit at least an energy flow from the second connection to the connection point in a conducting state and to block at least the energy flow to the connection point in a blocking state. The second switching device may likewise have, for example, a semiconductor switch, for example a power MOSFET, and/or a relay. If the second secondary vehicle electrical system component is intended to be supplied with energy from the primary vehicle electrical system, the conducting state is provided for both switching devices. The conducting state of both switching devices enables an energy flow path from the second connection, via the two switching devices, to the first connection. If the secondary vehicle electrical system component is connected to the first connection and the primary vehicle electrical system is connected to the second connection, electrical energy can therefore flow from the primary vehicle electrical system to the secondary vehicle electrical system component via the energy flow path.

If the at least one secondary vehicle electrical system component is not intended to be operated, the first switching device can be operated in the blocking state. The secondary vehicle electrical system component is therefore not supplied with electrical energy from the battery cell assembly or with electrical energy from the primary vehicle electrical system. For example, the secondary vehicle electrical system component is not operated in a functional state of the primary vehicle electrical system. The secondary vehicle electrical system component is therefore operated or activated, for example, only if the at least one primary vehicle electrical system component fails. Provision may also be made for the secondary vehicle electrical system component to be inactive and for the first switching device to have the blocking state in a non-automated, manual driving mode of the motor vehicle.

In order to prevent an overload, which occurs in the primary vehicle electrical system and is caused, for example, by a short circuit in the primary vehicle electrical system, from being transferred to the secondary vehicle electrical system, at least the second switching device can be changed to the blocking state in the event of an overload. Such an overload may be, for example, an overcurrent and/or an overvoltage in the primary vehicle electrical system. The overcurrent may be, for example, a brief overcurrent in the form of a current spike and/or a permanent overcurrent resulting in overheating of the secondary vehicle electrical system battery. As a result of the blocking state of the second switching device, which is provided, for example, by opening the relay or deactivating the semiconductor switch, the overload can be kept away from the at least one secondary vehicle electrical system component and from the battery cell assembly.

In order to provide the different switching states, that is to say the conducting state and the blocking state, of the switching devices, the secondary vehicle electrical system battery has the control device which is designed to control the controllable switching devices. The provision of a respective required switching state should be understood as meaning either the practice of changing to the required switching state or maintaining the required switching state. The control device may be, for example, a component of a battery management system of the secondary vehicle electrical system battery.

As a result of the two integrated switching devices which can be connected to the primary vehicle electrical system and to the secondary vehicle electrical system via the two connections, a multiplicity of functions can be advantageously provided by the secondary vehicle electrical system battery. The secondary vehicle electrical system battery can be used to supply a secondary vehicle electrical system component with electrical energy both from the battery cell assembly and from the primary vehicle electrical system. Fluctuations in the primary vehicle electrical system, for example in the event of an overload, can be additionally kept away from the secondary vehicle electrical system. In particular, there is therefore no need for a DC/DC converter between the primary vehicle electrical system and the secondary vehicle electrical system battery. Dispensing with the DC/DC converter has a positive effect on a weight, costs, an installation space and a power loss of the vehicle electrical system.

It proves to be advantageous if the control device is designed, in order to charge the battery cell assembly with energy from the primary vehicle electrical system, to provide the conducting state at least for the second switching device. The conducting state of the second switching device permits an energy flow from the second connection to the battery cell assembly via the connection point. In this case, the first switching device may have the blocking state, for example. The battery cell assembly can be charged, for example, in the parked state of the motor vehicle and/or in a manual driving mode of the motor vehicle by virtue of the control device changing the second switching device to the conducting state.

The battery cell assembly and the switching devices are preferably arranged in a common battery housing, wherein the two connections are arranged in a housing wall of the battery housing. The switching devices are therefore integrated in the secondary vehicle electrical system battery. In particular, the control device is also arranged in the battery housing. The secondary vehicle electrical system battery is therefore particularly compact and provides a multiplicity of different functions.

According to one embodiment, the second switching device has a switching element which can be blocked at least in the direction of the connection point, in particular a semiconductor switch and/or a relay. In order to permanently block an energy flow from the connection point to the second connection, the second switching device has a reverse-biased diode in series with the switching element. The switching element is designed to block at least the energy flow from the second connection to the connection point, for example in the event of the overload on the primary vehicle electrical system side, in the blocking state of the second switching device. The diode may be connected, for example, between the second connection and the switching element. The diode is reverse-biased in the direction of the second connection, with the result that the energy flow from the connection point to the second connection is permanently blocked by the diode, both in the conducting state and in the blocking state of the switching element. This diode is particularly advantageous if a semiconductor switch with a parasitic body diode or inverse diode is used as the switching element. On account of this inverse diode, which is conductive in the direction of the second connection in the blocking state of the semiconductor switch, the energy flow can be blocked only in a unidirectional manner in the direction of the connection point. In order to prevent the energy flow in the direction of the second connection, provision is made of the diode which is reverse-connected in series with the inverse diode in the blocking state of the semiconductor switch. The diode can be advantageously used to prevent an overload in the secondary vehicle electrical system from being transferred to the primary vehicle electrical system, for example.

Alternatively, the second switching device in the conducting state is designed to conduct an energy flow from the connection point to the second connection, wherein the control device is designed, in order to provide an energy supply for the primary vehicle electrical system from the battery cell assembly of the secondary vehicle electrical system battery, to provide the conducting state for the second switching device. The second switching device is therefore designed to conduct the energy flow in a bidirectional manner in the conducting state of the second switching device. The secondary vehicle electrical system battery can therefore also be advantageously used to supply the primary vehicle electrical system or to support the primary vehicle electrical system battery. For this purpose, an energy flow path can be provided from the battery cell assembly to the primary vehicle electrical system via the connection point, via the second switching device and via the second connection.

It proves to be advantageous if the first and/or the second switching device is/are designed to bidirectionally block and conduct the energy flow between the respective connection and the connection point. The first and/or the second switching device each has/have, in particular, two anti-serial semiconductor switches and/or at least one relay. In the blocking state of the two anti-serial semiconductor switches, for example power MOSFETs, the respective inverse diodes are reverse-connected in series, with the result that an energy flow can be blocked in both directions. A relay can be blocked in a bidirectional manner in the open state and is bidirectionally conductive in the closed state. The bidirectional conductivity and blocking ability is particularly advantageous in the second switching device, in particular, since the component of one vehicle electrical system can be supplied from the battery of the other vehicle electrical system in the conducting state of the second switching device and an overload in one vehicle electrical system can be kept away from the other vehicle electrical system in the blocking state of the second switching device.

In one development of the invention, the control device is designed to monitor a current and/or a voltage of the primary vehicle electrical system on the basis of current sensor data and/or voltage sensor data and to detect, as the overload, an overcurrent value of the current which exceeds a predetermined current limit value and/or an overvoltage value of the voltage which exceeds a predetermined voltage limit value. The control device can receive the sensor data, for example, and can detect the overload by analyzing the sensor data. The sensor data can be transmitted to the control device by a sensor device of the primary vehicle electrical system, for example via a communication channel. However, provision may also be made for the secondary vehicle electrical system battery to have at least one sensor device for capturing the current sensor data and/or the voltage sensor data relating to the primary vehicle electrical system. Such a sensor device can be electrically connected to the second connection and can measure the voltage applied to the second connection and/or the current flowing via the second connection. The sensor data from the sensor device of the secondary vehicle electrical system battery can then be made available to the control device which can detect the overload. If the overload is detected, the control device can provide the blocking state for the second switching device.

In a further embodiment, the second switching device has two anti-serial semiconductor switches with an integrated inverse diode, wherein the control device is designed to provide a diagnostic mode for the secondary vehicle electrical system battery and to change that one of the semiconductor switches with the inverse diode which is forward-biased in the direction of the connection point from the second connection to a blocking state for a predetermined diagnostic period and, in order to diagnose a fault in the secondary vehicle electrical system battery, to monitor at least one characteristic variable captured by a sensor device of the secondary vehicle electrical system battery during the diagnostic period. The sensor device is designed, in particular, to capture at least one of the following as the characteristic variable: current between the connection point and a ground connection of the battery cell assembly, current between the second connection and the connection point, voltage at the first connection, voltage at the second connection, voltage across the semiconductor switch. The control device is preferably designed to diagnose, as the fault, an interruption in the electrical connection between the battery cell assembly and ground and/or a switching inability of the semiconductor switch to be changed to the blocking state for the diagnostic mode and/or a non-functionality of the sensor device.

That one of the two anti-serial semiconductor switches, the inverse diode of which is forward-biased in the direction of the battery cell assembly and therefore cannot be blocked in the direction of the connection point, is used to diagnose a fault in the secondary vehicle electrical system battery. For this purpose, this diagnostic semiconductor switch is briefly changed to the blocking state or opened for the predetermined diagnostic period in order to provide the diagnostic mode, thus enabling a current from the battery cell assembly in a targeted manner. In this case, the diagnostic mode can be provided by the control device cyclically, for example at an interval of 1 s or 1 ms, during operation of the secondary vehicle electrical system battery.

For example, it is possible to carry out an electrical diagnosis during which a check is carried out in order to determine whether the electrical connection between the battery cell assembly and a ground connected to the ground connection of the secondary vehicle electrical system battery is present or is at least impaired, in particular interrupted. An interruption in this electrical connection, that is to say a ground loss at the secondary vehicle electrical system battery, would result, in the event of a fault in the primary vehicle electrical system, in the immediate failure of both vehicle electrical systems, that is to say the primary vehicle electrical system and the redundant secondary vehicle electrical system. In order to detect the ground loss, the diagnostic semiconductor switch is opened, as a result of which its inverse diode produces a potential difference at the level of the forward voltage. If the electrical connection to the ground connection is present, this results in a current flow from the battery cell assembly, in which case the latter is discharged only slightly, for example by at most 1.3 V.

If the electrical connection to ground is correctly present, the current between the connection point and the ground connection exceeds a predetermined threshold value, for example 10 A, after the diagnostic semiconductor switch has been opened since the current for supplying the secondary vehicle electrical system component is effected directly from the battery cell assembly. The current between the connection point and the ground connection can be captured by a first current sensor of the sensor device, for example. In the event of the ground loss and therefore the interruption in the electrical connection, this current would be approximately 0 A.

In addition, a current between the second connection and the connection point can be captured, for example, by a second current sensor of the sensor device. If the connection to ground is present, the secondary vehicle electrical system component is no longer supplied with current from the primary vehicle electrical system, but rather from the battery cell assembly, after the diagnostic semiconductor switch has been opened, with the result that virtually no current flows via the inverse diode of the diagnostic semiconductor switch. If the current via the inverse diode therefore considerably undershoots the predetermined threshold value, the electrical connection is assessed as being present. In the event of the ground loss, a current provided by the primary vehicle electrical system in order to support the secondary vehicle electrical system component would almost immediately flow via the inverse diode of the open diagnostic semiconductor switch and would therefore exceed the threshold value.

As an alternative or in addition to monitoring the currents, a voltage across the diagnostic semiconductor switch can be captured by a first voltage sensor of the sensor device. If this voltage undershoots the forward voltage of the inverse diode, the electrical connection is assessed as being present. If the voltage corresponds at least to the forward voltage, this is an indication that a current provided by the primary vehicle electrical system flows via the inverse diode of the diagnostic semiconductor switch in order to support the secondary vehicle electrical system, and the secondary vehicle electrical system battery therefore does not have a connection to ground.

In addition, the voltage captured by a second voltage sensor of the sensor device at the first connection can be compared with the voltage captured by a third voltage sensor of the sensor device at the second connection. If the ground connection is connected, both voltages are approximately the same, that is to say differ from one another at most by a predetermined limit value. In the event of the ground loss, the voltage at the first connection would drop slightly in comparison with the voltage at the second connection, which, although not restricting the functionality of the secondary vehicle electrical system, makes it possible to diagnose the ground loss.

It is also possible to carry out an actuator diagnosis, during which a check is carried out in order to determine whether the diagnostic semiconductor switch, which is intended to prevent energy from being fed into the primary vehicle electrical system in the event of a short circuit in the primary vehicle electrical system outside the diagnostic mode, can actually be switched. In other words, a check is carried out in order to determine whether this diagnostic semiconductor switch actually reacts to a signal from the control device for providing the blocking state. For example, it may be the case that the diagnostic semiconductor switch can no longer be opened because it has broken down and therefore cannot be switched. For diagnosis, the signal for the blocking state is made available to the diagnostic semiconductor switch by the control device.

The diagnostic semiconductor switch opens in the switchable state, in which case a current through the battery cell assembly at the level of the previous current present before the diagnostic mode through the second connection is established. In the switchable state, the current between the second connection and the connection point is at least briefly 0 A since the current for the secondary vehicle electrical system component flows directly from the battery cell assembly. Virtually no current therefore also flows via the inverse diode of the diagnostic semiconductor switch since the power supply for the secondary vehicle electrical system component is moved from the primary vehicle electrical system to the battery cell assembly.

If the diagnostic semiconductor switch could not be switched and could not change to the blocking state in response to the signal from the control device, the power supply would not be moved from the primary vehicle electrical system to the battery cell assembly. The current through the battery cell assembly would be captured as 0 A and a current provided by the primary vehicle electrical system would still be able to be measured between the second connection and the connection point.

In addition, a sensor diagnosis can be carried out in the diagnostic mode, during which a check is carried out in order to determine whether the sensor device is functional. For example, the sensor device may have current sensors between the second connection and the connection point and between the connection point and the ground connection. A current between the connection point and the first connection can be determined, for example arithmetically, using Kirchhoff's current law or a further current sensor can be provided there. As already described, the diagnostic semiconductor switch and the ground connection can be checked with the aid of these current sensors. In order to be able to carry out this electrical diagnosis and the actuator diagnosis in a reliable manner, the functionality of the sensor device should also be checked. If the diagnostic semiconductor switch is opened in order to provide the diagnostic mode, the values of the characteristic variables, as already described in connection with the actuator diagnosis in the switchable state of the semiconductor switch and in connection with the electrical diagnosis in the state connected to ground, are established. If the sensors of the sensor device capture values of the characteristic variables which differ from the described values of the characteristic variables, the non-functionality of the current sensors can be detected thereby.

A motor vehicle according to the invention comprises a vehicle electrical system according to the invention. The motor vehicle is, in particular, an automobile which is designed for at least highly automated driving, that is to say for highly automated driving and/or fully automated driving.

The embodiments and their advantages presented with respect to the secondary vehicle electrical system battery according to the invention accordingly apply to the vehicle electrical system according to the invention and to the motor vehicle according to the invention.

Further features of the invention emerge from the claims, the figures and the description of the figures. The features and combinations of features mentioned above in the description and the features and combinations of features mentioned below in the description of the figures and/or shown in the figures alone can be used not only in the respectively stated combination but also in other combinations or alone.

The invention is now explained in more detail on the basis of a preferred exemplary embodiment and with reference to the drawings.

BRIEF DESCRIPTION OF THE DRAWINGS

FIG. 4 is a schematic illustration of a fourth embodiment of a vehicle electrical system according to the invention.

In the figures, identical and functionally identical elements are provided with the same reference signs.

DETAILED DESCRIPTION OF THE DRAWINGS

Figure 1:
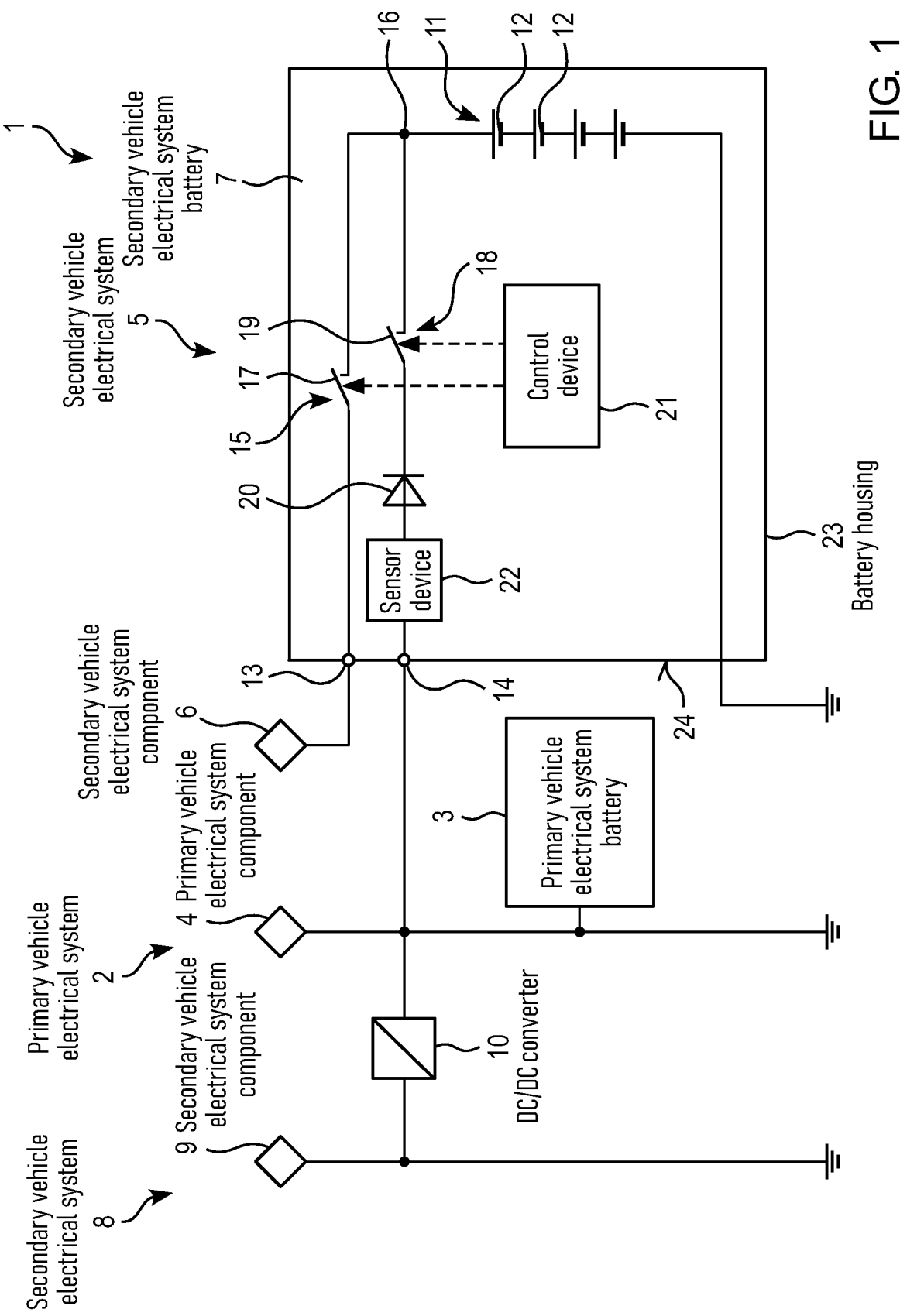
FIG. 1 is a schematic illustration of a first embodiment of a vehicle electrical system according to the invention.

FIG. 1 shows a vehicle electrical system 1 for a motor vehicle, which is not shown here. The vehicle electrical system 1 has a primary vehicle electrical system 2 with a primary vehicle electrical system battery 3 and with at least one primary vehicle electrical system component 4. The vehicle electrical system 1 also has a secondary vehicle electrical system 5 which is redundant with respect to the primary vehicle electrical system 2. The secondary vehicle electrical system 5 is a so-called highly automated driving and/or fully automated driving vehicle electrical system which has at least one secondary vehicle electrical system component 6 required for highly automated driving. Such a secondary vehicle electrical system component 6 is, for example, a sensor for capturing the environment of the motor vehicle and/or an actuator for intervening in longitudinal dynamics and lateral dynamics of the motor vehicle. The secondary vehicle electrical system 5 has a secondary vehicle electrical system battery 7. In this case, the vehicle electrical system 1 has a further secondary vehicle electrical system 8, the further secondary vehicle electrical system component 9 of which is supplied with electrical energy here from the primary vehicle electrical system 2 via a DC/DC converter 10. The further secondary vehicle electrical system 8 therefore does not have its own battery here. Alternatively or additionally, the further secondary vehicle electrical system 8 may also have its own battery, with the result that the further secondary vehicle electrical system component 9 can be supplied with energy from its own battery and/or from the primary vehicle electrical system 2.

The secondary vehicle electrical system battery 7 has a battery cell assembly 11 which here comprises a series circuit of battery cells 12. The secondary vehicle electrical system battery 7 is electrically connected to the secondary vehicle electrical system component 6 via a first connection 13. The secondary vehicle electrical system battery 7 is electrically connected to the primary vehicle electrical system 2 via a second connection 14 without the interposition of a DC/DC converter. The secondary vehicle electrical system battery 7 also has a first switching device 15 which is electrically connected to the first connection 13 and to a connection point 16. The connection point 16 is also electrically connected to the battery cell assembly 11. The first switching device 15 here has a relay 17. In a blocking state of the first switching device 15, that is to say when the relay 17 is open, an energy flow between the first connection 13 and the connection point 16 is interrupted in a bidirectional manner. The secondary vehicle electrical system component 6 therefore cannot be supplied with electrical energy from the battery cell assembly 11. In a conducting state of the first switching device 15, that is to say when the relay 17 is closed, an energy flow is possible between the first connection 13 and the connection point 16. The secondary vehicle electrical system component 6 can be supplied with electrical energy from the battery cell assembly 11, for example.

The secondary vehicle electrical system battery 7 also has a second switching device 18 which is electrically connected to the second connection 14 and to the connection point 16. The second switching device 18 here likewise has a relay 19 and a diode 20. In a blocking state of the second switching device 18, that is to say when the relay 19 is open, an energy flow between the second connection 14 and the connection point 16 is interrupted in a bidirectional manner. In the blocking state of the second switching device 18, an overload on the primary vehicle electrical system side, for example an overcurrent and/or an overvoltage in the primary vehicle electrical system 2, can be kept away from the secondary vehicle electrical system 5 since the second switching device 18 blocks the energy flow from the second connection 14 connected to the primary vehicle electrical system in the direction of the connection point 16.

In a conducting state of the second switching device 18, that is to say when the relay 19 is closed, an energy flow is possible from the second connection 14 to the connection point 16. An energy flow from the connection point 16 in the direction of the second connection 14 is blocked by the diode 20. If both the first switching device 15 and the second switching device 18 have the conducting state, the secondary vehicle electrical system component 6 can also be supplied with electrical energy from the primary vehicle electrical system 2. If at least the second switching device 18 has the conducting state, the secondary vehicle electrical system battery 7 can be charged by the primary vehicle electrical system 2 by supplying electrical energy from the primary vehicle electrical system 2 to the battery cell assembly 11.

A control device 21 of the secondary vehicle electrical system battery 7 is designed to control the switching devices 15, 18. If, for example, the secondary vehicle electrical system component 6 is intended to be supplied from the primary vehicle electrical system 2, both switching devices 15, 18 are changed to the conducting state. If, for example, the overload occurs in the primary vehicle electrical system 2, at least the second switching device 18 is changed to the blocking state. In the event of the overload on the primary vehicle electrical system side, the first switching device 15 can be changed to the conducting state, with the result that the secondary vehicle electrical system component 6 is supplied with electrical energy from the battery cell assembly 11. The overcurrent on the primary vehicle electrical system side and/or the overvoltage on the primary vehicle electrical system side can be captured, for example, at the second connection 14 by means of a sensor device 22.

The two switching devices 15, 18, the battery cell assembly 11 and the control device 21 can be integrated in a common battery housing 23. The connections 13, 14 can be arranged in a housing wall 24 of the battery housing 23. The secondary vehicle electrical system battery 7 is therefore in the form of a compact component which provides a multiplicity of functions.

Figure 2:
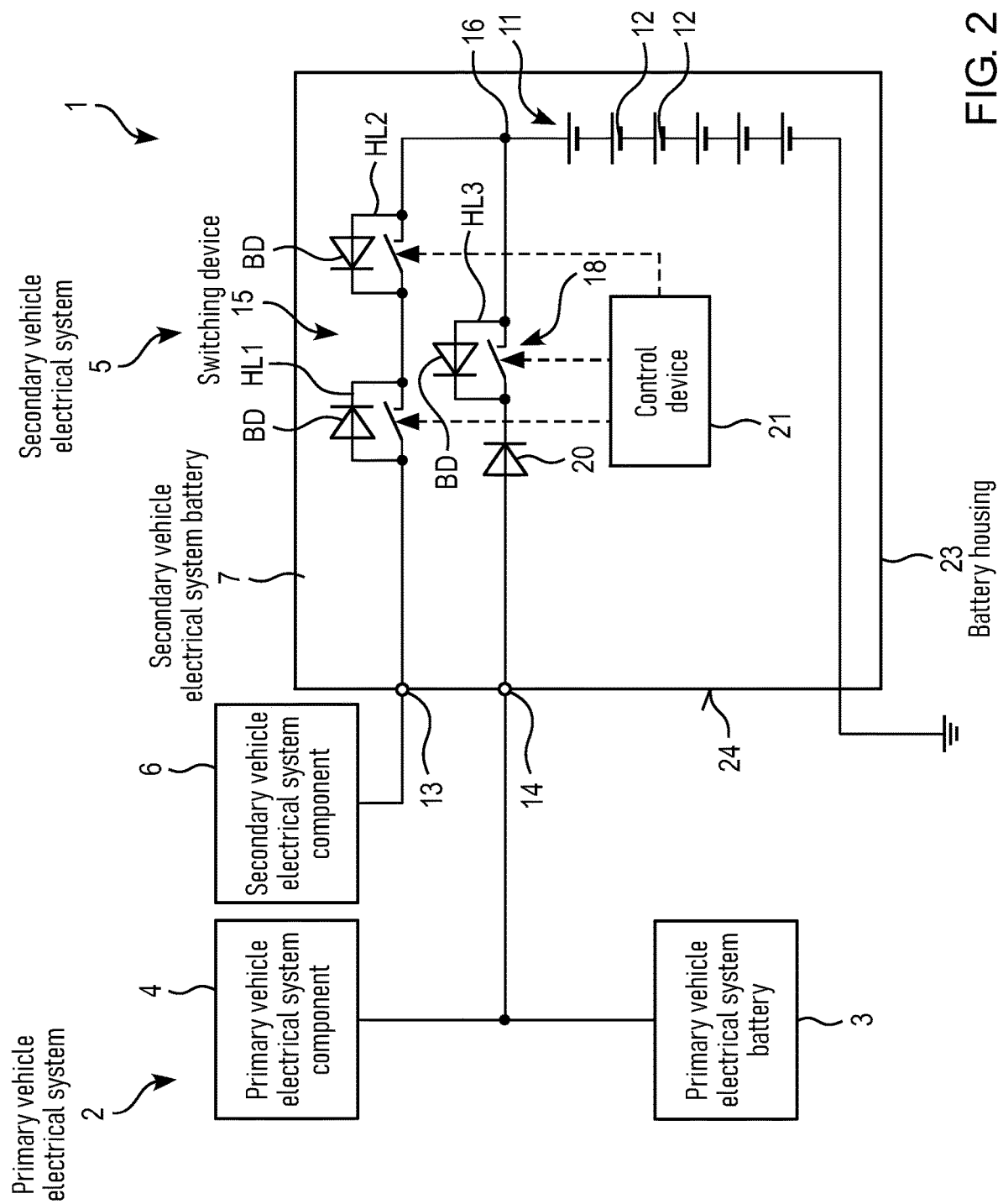
FIG. 2 is a schematic illustration of a second embodiment of a vehicle electrical system according to the invention.

FIG. 2 shows a further embodiment of the vehicle electrical system 1 for the motor vehicle. Here, the second switching device 15 has two anti-serial semiconductor switches HL1, HL2, for example MOSFETs. In order to provide the blocking state of the first switching device 15, both semiconductor switches HL1, HL2 can be switched off. Parasitic inverse diodes BD of the semiconductor switches HL1, HL2 are reverse-connected in series in the blocking state of the semiconductor switches HL1, HL2 and block an energy flow between the first connection 13 and the connection point 16 in both directions or in a bidirectional manner. The second switching device 18 likewise has a semiconductor switch HL3, for example a MOSFET, which can be blocked, however, only in a unidirectional manner in the direction of the connection point 16. The inverse diode BD of the semiconductor switch HL3 permits an energy flow in the direction of the second connection 14, even in the blocking state of the semiconductor switch HL3. However, the diode 20 connected upstream in series with the semiconductor switch HL3 can permanently block the energy flow in the direction of the second connection 14, both in the conducting state and in the blocking state of the semiconductor switch HL3.

Figure 3:
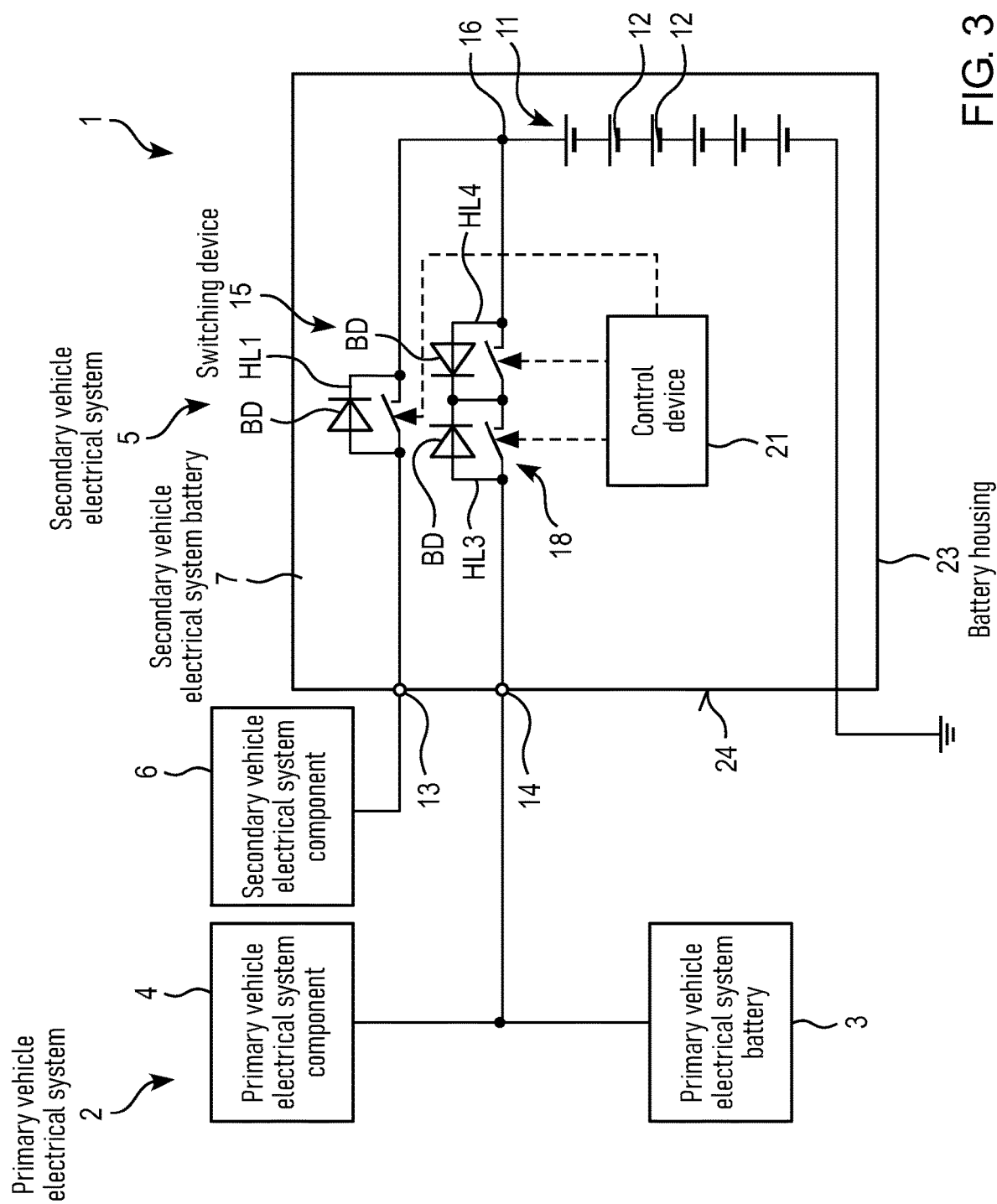
FIG. 3 is a schematic illustration of a third embodiment of a vehicle electrical system according to the invention.

FIG. 3 shows a further embodiment of the vehicle electrical system 1 for the motor vehicle. The first switching device 15 here has only the semiconductor switch HL1 which can be blocked in a unidirectional manner. The inverse diode RD also permits an energy flow from the first connection 13 electrically connected to the secondary vehicle electrical system component 6 to the connection point 16 in the blocking state of the semiconductor switch HL1. An energy flow from the connection point 16 to the secondary vehicle electrical system component 6 is blocked in the blocking state of the semiconductor switch HL1. However, like in FIG. 2, the first switching device 15 can also have two anti-serial semiconductor switches for forming a bidirectional blocking ability of the first switching device 15.

In addition to the semiconductor switch HL3, the second switching device 18 has a second anti-serial semiconductor switch HL4. In the blocking state of both semiconductor switches HL3, HL4, that is to say in the blocking state of the second switching device 18, an energy flow between the second connection 14 and the connection point 16 is blocked in a bidirectional manner. It is therefore possible, for example, to keep an overload on the primary vehicle electrical system side away from the secondary vehicle electrical system 5 and to keep an overload on the secondary vehicle electrical system side away from the primary vehicle electrical system 2. As a result of the bidirectional blocking ability of the second switching device 18, as provided by means of the anti-serial semiconductor switches HL3, HL4, it is possible to dispense with the diode 20, as shown in FIG. 1 and FIG. 2.

As a result of the missing diode 20, the second switching device 18 is bidirectionally conductive in the conducting state. An energy flow can therefore also take place from the connection point 16 in the direction of the second connection 14. The primary vehicle electrical system 2 can therefore also be supplied with electrical energy by the secondary vehicle electrical system battery 7. In other words, the primary vehicle electrical system battery 3 can be supported by the secondary vehicle electrical system battery 7. For this purpose, the control device 21 can provide the conducting state of the second switching device 18 and can control the energy flow in the direction of the primary vehicle electrical system 2.

Figure 4:
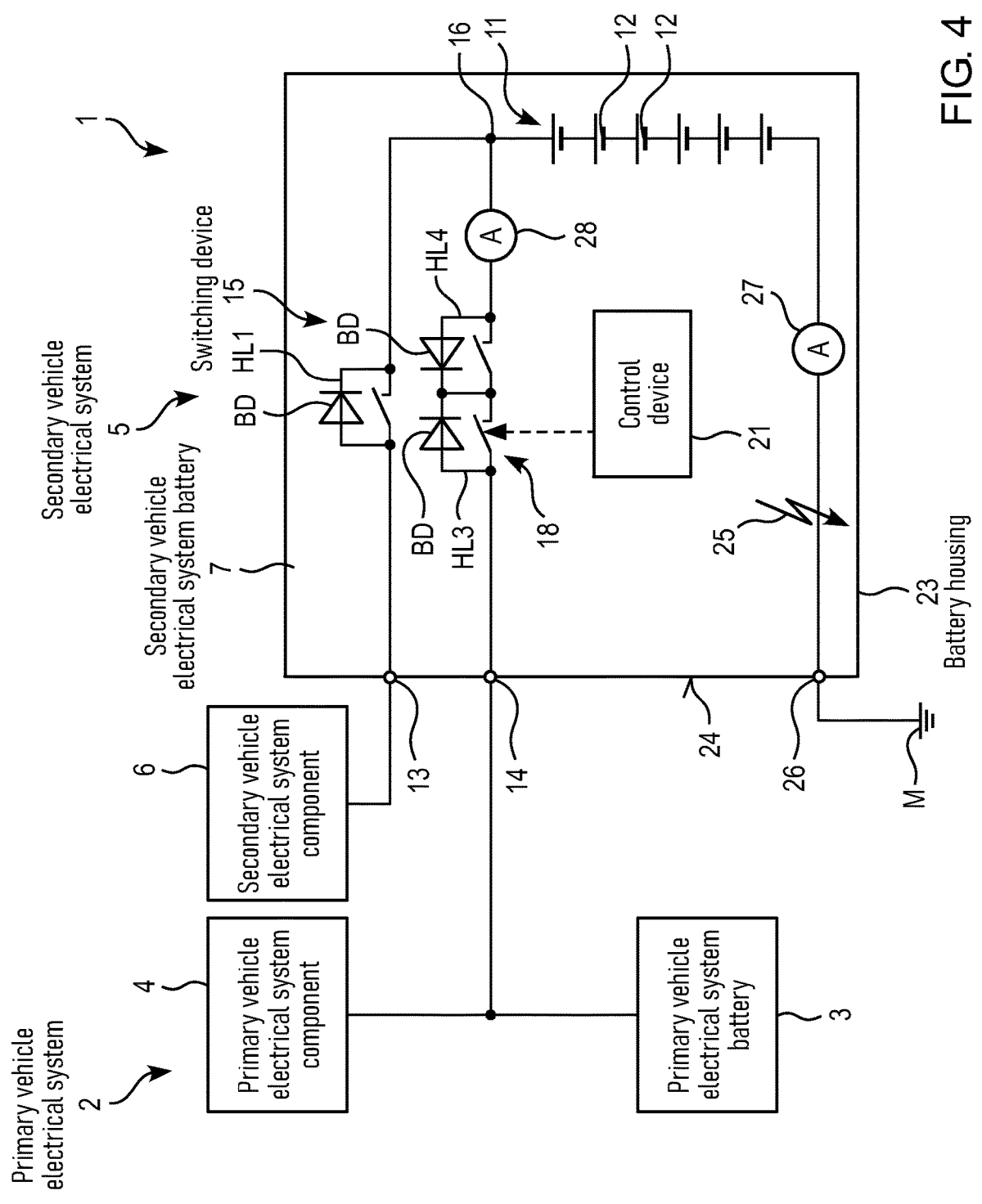

FIG. 4 shows a further embodiment of the vehicle electrical system 1 in which the control device 21 is designed to operate the secondary vehicle electrical system battery 7 in a diagnostic mode using the two anti-serial semiconductor switches HL3, HL4 of the second switching device 18. In order to provide the diagnostic mode, the control device 21 can open that semiconductor switch HL3, the inverse diode BD of which is forward-biased from the second connection 14 to the connection point 16 and therefore to the battery cell assembly 11. For example, the control device 21 can diagnose whether there is a fault in the secondary vehicle electrical system battery 7 in the form of an interruption 25 or an impairment in the electrical connection between the battery cell assembly 11 and a ground connection 26 of the battery cell assembly 11 with respect to ground M. The ground M may be, for example, a body of the motor vehicle. The diagnostic mode can be carried out cyclically, at predetermined diagnostic times and during operation of the secondary vehicle electrical system battery 7.

Opening the semiconductor switch HL3 or providing the blocking state for the semiconductor switch HL3 specifically enables a current from the battery cell assembly 11 in the direction of the ground connection 26 if the interruption 25 is not present and the connection to ground M is therefore correctly present. This current from the battery cell assembly 11 can be captured using a first current sensor 27, for example. If the current captured by the first current sensor 27 is greater than a predetermined threshold value, for example 10 A, the interruption 25 is not present and the battery cell assembly 11 is connected to ground M. If the current captured by the first current sensor 27 is less than the predetermined threshold value, the electrical connection to ground M has at least deteriorated. If the captured current is approximately 0 A, the interruption 25 is present and the battery cell assembly 11 is not connected to ground M. Although such a ground loss at the secondary vehicle electrical system battery 7 does not result in failure of the secondary vehicle electrical system 5, a further fault in the primary vehicle electrical system 2 would result in the immediate failure of both vehicle electrical systems 2, 5.

In addition, the current between the second connection 14 and the connection point 28 can be monitored by a second current sensor 28. In the case of the correct connection to ground M, the current for the secondary vehicle electrical system component 6 flows directly from the battery cell assembly 11 when the semiconductor switch HL3 is open, in which case the current via the inverse diode BD of the semiconductor switch HL3 is virtually 0 A. If the interruption 25 in the ground connection were present, a current would immediately flow via the inverse diode BD of the semiconductor switch HL3, which can be captured by the second current sensor 28 and can be diagnosed as a fault by the control device 21.

As an alternative or in addition to capturing the currents for checking the electrical connection between the battery cell assembly 11 and ground M, the voltages at the first connection 13, at the second connection 14 and across the semiconductor switch HL3 can also be monitored. If the interruption 25 in the ground connection were present, the voltage at the first connection 13 would drop and would become less than the voltage at the second connection 14. In addition, a voltage across the semiconductor switch HL3 would correspond at least to a forward voltage of the inverse diode BD.

In the diagnostic mode, it is also possible to check whether the semiconductor switch HL3 can switch properly or has broken down, for example. In the broken-down state, the semiconductor switch HL3, which is usually closed during operation of the vehicle electrical systems 2, 5, can no longer be opened and therefore can no longer prevent a supply into the primary vehicle electrical system 2 in the event of a short circuit in the primary vehicle electrical system 2. In order to diagnose this switching inability of the semiconductor switch HL3, a check is carried out in order to determine whether, in the diagnostic mode in which the semiconductor switch HL3 should actually be opened by the control device 21, the semiconductor switch HL3 is also actually open. For example, the opened state of the semiconductor switch HL3 can be detected if a current flowing from the battery cell assembly 11 in the direction of the connection point 16 corresponds approximately to the current which flowed through the second connection 14 before the provision of the diagnostic mode. In this case, the secondary vehicle electrical system component 6 is specifically supplied with current from the battery cell assembly 11 after the semiconductor switch HL3 has been opened.

This is because, if the semiconductor switch HL3 were incapable of switching and could no longer be opened, the power supply for the secondary vehicle electrical system component 6 would not be moved from the primary vehicle electrical system 2 to the power supply from the battery cell assembly 11. The current between the battery cell assembly 11 and the connection point 16 would then be approximately 0 A and the secondary vehicle electrical system component 6 would continue to be supplied with current from the primary vehicle electrical system 2. The open state and therefore the switching ability of the semiconductor switch HL3 can also be detected if the current captured using the second current sensor 28 in the diagnostic mode is briefly approximately 0 A. These current values which should be captured by the current sensors 27, 28 in the open state of the semiconductor switch HL3 can also be used to diagnose the functionality of the current sensors 27, 28. This is because, if the semiconductor switch HL3 is functional and is open in the diagnostic mode, the current sensors 27, 28 must capture corresponding values. If they do not do this, they are diagnosed as non-functional.

No restrictions result from the diagnostic mode, that is to say from opening the semiconductor switch HL3, since, even in the event of an interruption between the connection point 16 and the ground connection 26, a current for supplying the secondary vehicle electrical system component 6 can flow via the inverse diode BD of the semiconductor switch HL3. The voltage at the first connection 13 would drop only slightly, in particular by a maximum of 1.3 V. The secondary vehicle electrical system 5 is therefore still fully supported and there is no functional restriction.

LIST OF REFERENCE SIGNS

1 Vehicle electrical system
2 Primary vehicle electrical system
3 Primary vehicle electrical system battery
4 Primary vehicle electrical system component
5 Secondary vehicle electrical system
6 Secondary vehicle electrical system component
7 Secondary vehicle electrical system battery
8 Further secondary vehicle electrical system
9 Further secondary vehicle electrical system component
10 DC/DC converter
11 Battery cell assembly
12 Battery cell
13 First connection
14 Second connection
15 First switching device
16 Connection point
17 Relay
18 Second switching device
19 Relay
20 Diode
21 Control device
22 Sensor device
23 Battery housing
24 Housing wall
25 Interruption
26 Ground connection
HL1, HL2, HL3, HL4 Semiconductor switches
BD Inverse diodes
M Ground

What is claimed is:

1. A secondary vehicle electrical system battery for a secondary vehicle electrical system which is redundant with respect to a primary vehicle electrical system of a motor vehicle, comprising:
a battery cell assembly for providing electrical energy;
a first connection for electrically connecting the secondary vehicle electrical system battery to at least one secondary vehicle electrical system component;
a second connection for electrically connecting the secondary vehicle electrical system battery to the primary vehicle electrical system;
a first switching device between the first connection and a connection point electrically connected to the battery cell assembly;
a second switching device between the second connection and the connection point; and
a control device which is configured, in order to supply the at least one secondary vehicle electrical system component from the primary vehicle electrical system, to provide a conducting state for both the first and second switching devices in order to permit an energy flow from the second connection to the first connection via the connection point and, in order to keep an overload on the primary vehicle electrical system side away, to provide a blocking state for the second switching device in order to block an energy flow from the second connection to the connection point.

2. The secondary vehicle electrical system battery according to claim 1, wherein
the control device is configured, in order to charge the battery cell assembly with energy from the primary vehicle electrical system, to provide the conducting state at least for the second switching device in order to permit an energy flow from the second connection to the battery cell assembly via the connection point.

3. The secondary vehicle electrical system battery according to claim 1, wherein
the battery cell assembly and the first and second switching devices are arranged in a common battery housing, and
the first and second connections are arranged in a housing wall of the battery housing.

4. The secondary vehicle electrical system battery according to claim 1, wherein the second switching device comprises:
a switching element which is blockable at least in the direction of the connection point, and
a reverse-biased diode in series with the switching element in order to permanently block an energy flow from the connection point to the second connection.

5. The secondary vehicle electrical system battery according to claim 4, wherein
the switching element is a semiconductor switch and/or a relay.

6. The secondary vehicle electrical system battery according to claim 1, wherein
the second switching device in the conducting state is designed to permit an energy flow from the connection point to the second connection, and
the control device is configured, in order to provide an energy supply for the primary vehicle electrical system from the battery cell assembly of the secondary vehicle electrical system battery, to provide the conducting state for the second switching device.

7. The secondary vehicle electrical system battery according to claim 1, wherein
the first and/or the second switching device are designed to bidirectionally block and conduct the energy flow between the respective connection and the connection point and each has two anti-serial semiconductor switches and/or at least one relay.

8. The secondary vehicle electrical system battery according to claim 1, wherein
the control device is configured to monitor a current and/or a voltage of the primary vehicle electrical system on the basis of current sensor data and/or voltage sensor data and to detect, as the overload, an overcurrent value of the current which exceeds a predetermined current limit value and/or an overvoltage value of the voltage which exceeds a predetermined voltage limit value.

9. The secondary vehicle electrical system battery according to claim 8, wherein
the secondary vehicle electrical system battery has at least one sensor device for capturing the current sensor data and/or the voltage sensor data relating to the primary vehicle electrical system.

10. The secondary vehicle electrical system battery according to claim 1, wherein the second switching device comprises:
two anti-serial semiconductor switches with integrated inverse diodes, wherein
the control device is configured to provide a diagnostic mode for the secondary vehicle electrical system battery and to change that one of the semiconductor switches with the inverse diode which is forward-biased in the direction of the connection point from the second connection to a blocking state for a predetermined diagnostic period and, in order to diagnose a fault in the secondary vehicle electrical system battery, to monitor at least one characteristic variable captured by a sensor device of the secondary vehicle electrical system battery during the diagnostic period.

11. The secondary vehicle electrical system battery according to claim 10, wherein
the sensor device is designed to capture at least one of the following as the characteristic variable:
current between the connection point and a ground connection of the battery cell assembly,
current between the second connection and the connection point,
voltage at the first connection,
voltage at the second connection, and
voltage across the semiconductor switch.

12. The secondary vehicle electrical system battery according to claim 10, wherein
the control device is configured to diagnose, as the fault, an interruption in the electrical connection between the battery cell assembly and ground and/or a switching inability of the semiconductor switch to be changed to the blocking state for the diagnostic mode and/or a non-functionality of the sensor device.

13. A vehicle electrical system for a motor vehicle, comprising:
a primary vehicle electrical system with at least one primary vehicle electrical system component and a primary vehicle electrical system battery for supplying the at least one primary vehicle electrical system component; and a secondary vehicle electrical system which is redundant with respect to the primary vehicle electrical system and comprises:
a battery cell assembly for providing electrical energy;
a first connection for electrically connecting the secondary vehicle electrical system battery to at least one secondary vehicle electrical system component;
a second connection for electrically connecting the secondary vehicle electrical system battery to the primary vehicle electrical system;
a first switching device between the first connection and a connection point electrically connected to the battery cell assembly;
a second switching device between the second connection and the connection point; and
a control device which is configured, in order to supply the at least one secondary vehicle electrical system component from the primary vehicle electrical system, to provide a conducting state for both the first and second switching devices in order to permit an energy flow from the second connection to the first connection via the connection point and, in order to keep an overload on the primary vehicle electrical system side away, to provide a blocking state for the second switching device in order to block an energy flow from the second connection to the connection point, wherein
the secondary vehicle electrical system battery is electrically connected to the at least one secondary vehicle electrical system component via the first connection and is electrically connected to the primary vehicle electrical system via the second connection.

14. The vehicle electrical system according to claim 13, wherein
the at least one primary vehicle electrical system component is in the form of a sensor and/or actuator for providing an at least highly automated driving mode of the motor vehicle, and
the at least one secondary vehicle electrical system component is in the form of a redundant sensor and/or actuator.

15. A motor vehicle comprising:
a vehicle electrical system comprising:
a primary vehicle electrical system with at least one primary vehicle electrical system component and a primary vehicle electrical system battery for supplying the at least one primary vehicle electrical system component; and
a secondary vehicle electrical system which is redundant with respect to the primary vehicle electrical system and comprises:
a battery cell assembly for providing electrical energy;
a first connection for electrically connecting the secondary vehicle electrical system battery to at least one secondary vehicle electrical system component;
a second connection for electrically connecting the secondary vehicle electrical system battery to the primary vehicle electrical system;
a first switching device between the first connection and a connection point electrically connected to the battery cell assembly;
a second switching device between the second connection and the connection point; and
a control device which is configured, in order to supply the at least one secondary vehicle electrical system component from the primary vehicle electrical system, to provide a conducting state for both the first and second switching devices in order to permit an energy flow from the second connection to the first connection via the connection point and, in order to keep an overload on the primary vehicle electrical system side away, to provide a blocking state for the second switching device in order to block an energy flow from the second connection to the connection point, wherein
the secondary vehicle electrical system battery is electrically connected to the at least one secondary vehicle electrical system component via the first connection and is electrically connected to the primary vehicle electrical system via the second connection.

* * * * *